United States Patent [19]

Compton

[11] 4,443,321

[45] Apr. 17, 1984

[54] SUPERCRITICAL SOLVENT COAL EXTRACTION

[75] Inventor: Leslie E. Compton, Claremont, Calif.

[73] Assignee: The United States of America as represented by the Administrator of the National Aeronautics and Space Administration, Washington, D.C.

[21] Appl. No.: 322,312

[22] Filed: Nov. 17, 1981

[51] Int. Cl.³ .................... C10G 1/00; C10G 1/06
[52] U.S. Cl. .................... 208/8 LE; 208/10
[58] Field of Search ............... 208/8 LE, 10

[56] References Cited

U.S. PATENT DOCUMENTS

| | | | |
|---|---|---|---|
| 1,925,005 | 8/1933 | Rose et al. | 44/1 B |
| 3,375,188 | 3/1968 | Bloomer | 208/8 R |
| 3,503,864 | 3/1970 | Nelson | 208/10 |
| 3,558,468 | 1/1971 | Wise | 208/8 |
| 3,607,716 | 9/1971 | Roach | 208/8 |
| 3,607,717 | 9/1971 | Roach | 208/8 |
| 3,850,738 | 11/1974 | Stewart et al. | 208/8 |
| 3,929,193 | 12/1975 | Duke | 208/8 LE X |
| 3,970,541 | 7/1976 | Williams et al. | 208/8 |
| 3,997,424 | 12/1976 | Urquhart | 208/8 |
| 4,005,005 | 1/1977 | McCallum et al. | 208/11 LE |
| 4,036,731 | 7/1977 | Martin | 208/8 |
| 4,089,658 | 5/1978 | Bay | 208/8 LE X |

OTHER PUBLICATIONS

Wm. S. Wise, Solvent Treatment of Coal, M & B Monograph CE/2, J. Cook, Edition, 1971.
Orchin, M. et al., Studies of the Extraction and Coking of Coal, Bulletin 506, Bureau of Mines.

*Primary Examiner*—William G. Wright
*Attorney, Agent, or Firm*—Paul F. McCaul; Thomas H. Jones; John R. Manning

[57] ABSTRACT

Yields of soluble organic extract are increased up to about 50% by the supercritical extraction of particulate coal at a temperature below the polymerization temperature for coal extract fragments (450° C.) and a pressure from 500 psig to 5,000 psig by the conjoint use of a solvent mixture containing a low volatility, high critical temperature coal dissolution catalyst such as phenanthrene and a high volatility, low critical temperature solvent such as toluene.

13 Claims, 2 Drawing Figures

SUPERCRITICAL SOLVENT COAL EXTRACTION

DESCRIPTION

ORIGIN OF THE INVENTION

The invention described herein was made in the performance of work under a NASA contract and is subject to the provisions of Section 305 of the National Aeronautics and Space Act of 1958, public law 83-568 (72 Statute 435; 42 U.S.C. 2454).

TECHNICAL FIELD

The present invention relates to the extraction of coal and, more particularly, to the solvent extraction of coal under supercritical conditions.

The U.S. reserve of coal is about 3 trillion tons. Although the most abundant (80%) fossil fuel in America is coal, the U.S. consumption pattern is quite a reversal of form in terms of utilization, with coal representing only 17%, oil and gas about 78%.

The demand for all the fossil fuels combined is expected to double by the year 2,000, even with increasing the use of nuclear power. While the domestic supply of crude oil and natural gas is not likely to keep pace with the energy demand, coal can play an important role in filling such a gap and thus reduce the requirements for imported supplies of oil and gas.

At the present time, about one-half of the electric power in the United States is generated from natural gas and petroleum; most of the other half is from coal. If coal can be economically converted to clean fuel for electric utilities, it could supply most of the energy needs of the United States for the next three centuries, and the rapidly depleting petroleum and natural gas resources could be conserved for other essential uses, especially as a raw material for the synthetic rubber and plastics industries. Liquefied coal can also supply chemical intermediates and useful raw materials for these industries.

BACKGROUND ART

Many coal liquefaction processes which are at an advanced stage of development operate in the liquid phase and are designed to produce boiler fuels (heavy liquids and solids at room temperature). The raw effluent product from the liquefaction stage of these processes consists of a very heavy, viscous liquefied coal with solids suspended in it. The coal minerals content of the product will be about 8-12%, and this has to be reduced to about 0.15% to meet stack emission requirements.

The inorganic content of coal represented by minerals, sulfur, arsenic, and other trace elements in the inorganic phase of coal present problems, since these elements can poison the catalysts utilized in coal gasification and liquefaction processes. Separation of these inorganics, especially sulfur, from the organic matter prior to use as fuel or feedstock has the advantage of reducing the amount of desulfurization, and no ash or slag or other extraneous material is left in the coal reactor. A pure carbon or hydrocarbon feedstock can be directly converted into various end products. Furthermore, raw coals vary widely in mineral keep and sulfur keep. As previously stated, such coals can not be used directly in many chemical conversion processes, e.g. coal liquefaction, where these impurities interfere with catalyst activity, and even with the processes in advanced stage of development the yields vary widely.

Solvent extraction of coal can be conducted in a manner that separates some of the inorganics such as minerals from a coal extract. However, current economic analysis indicates that since the yield of solvent extract is fairly low, typically around 20% or less, and the cost of the solvent is high, the residual coal must be separated from residual solvent and recovered and utilized as fuel. Though there have been many attempts to increase the amount of extraction, none of the processes for solvent extraction being developed have approached an economic level.

Extraction of the organic matter in coal with near or supercritical solvents is another possible way to perform the upgrading of coal into an inorganic-free, organic extract. Near the critical temperature, a highly dense gas which acts like a liquid solvent and efficiently extracts soluble components from coal can be made. Near the critical temperature the dense gas solvent can expand and contract with the involvement of very little energy. On expansion the dense gas loses its solvent properties, rendering it very easy and economical to separate solute from the dense solvent gas. Separation of the dense gas from the coal followed by expansion to release the solute is much easier than separating solvent liquid from a solid and a solute, as must be done in conventional solvent processes. The current state of the art for process demonstration units is exemplified in the publication of R. R. Maddocks et al in *C. E. Progress* (CEP), June, 1979 at pages 49-55. Maddocks et al report the extraction of coal at the critical temperature of toluene, 319° C. (606° F.), provides 21 weight percent yield of extract having a low ash content (0.08%) from coal having nearly 6.1% ash content. It is further suggested that this process would be commercially attractive if yields of extract could be increased. Other studies have shown that the economics of coal extraction rapidly rise as the extraction and efficiency increases from 20 to 40%.

It would be expected that coal extraction efficiency under supercritical conditions would increase if more efficient coal solvents such as the bent ring coal extract type of solvents such as phenanthrene were utilized. However, when phenanthrene or other highly efficient solvents are utilized, the critical temperature is so high that the coal extract cross-links or polymerizes and forms a very high percentage of char, or the temperature is sufficiently high to gasify the coal. Furthermore, very expensive materials are required for constructing a higher temperature reactor, and the energy cost to operate a higher temperature reactor and the energy cost to operate a higher temperature process is significantly higher. Other examples of low yield, supercritical solvent extraction of coal are U.S. Pat. Nos. 3,558,468 and 3,607,717 which illustrates the use of an aromatic solvent such as benzene at supercritical conditions. U.S. Pat. No. 3,607,716 utilizes phenanthrene under supercritical conditions to upgrade extracts of coal. U.S. Pat. No. 4,036,731 discloses a mixed solvent, hydrogen-active supercritical extraction process utilizing an aromatic solvent with a hydrogen donor solvent such as tetralin, tetrahydroquinoline or o-cyclohexylphenol, preferably practiced in the presence of hydrogen gas. Again the yields are mainly in the 20% range with some yields in the 30% range.

DISCLOSURE OF THE INVENTION

A supercritical solvent extraction technique has been developed in accordance with the invention which separates at least 40% of the organic matter in some coals into a substantially inorganic-free hydrocarbon extract. The coal is volatilized into a supercritical gas mixture comprised of a coal dissolution catalyst solvent, such as phenanthrene, having a high critical temperature (Tc) and a low volatility mixed with a second solvent having a critical temperature at least 100° C. lower than the catalyst solvent, such as toluene. The presence of the lower Tc solvent creates a lower Tc mixture and permits extraction of the coal solute at a temperature sufficiently low to avoid coal gasification and polymerization or cross-linking reactions such that the yields are generally about 30 to 50%, and in some cases yields over 50 weight percent of the organic matter in the coal have been achieved. The coal extract has a very low ash content and can have significantly reduced sulfur content and is suitable for direct conversion into lower viscosity liquid fuel products such as synthetic gasoline. During extraction in accordance with the invention, particulate coal is volatilized into the supercritical gas mixture of the coal dissolution catalyst and the secondary solvent. The catalyst contributes to the breakdown of the coal structure and volatilization of the resulting coal fragment molecules occurs simultaneously during this high yield extraction. The dissolved volatilized materials are removed in the gas phase leaving behind the inorganic materials. The gas phase catalyst and coal extract can readily be recovered by expansion, and the catalyst can be recovered from the coal extract by fractional distillation.

The process of the invention is conducted under controlled conditions. The maximum extraction temperature preferably does not exceed about 450° C. in order to avoid polymerization, cross-linking and gasification. The minimum temperature during extraction should be above about 250° C. in order to have sufficient thermal energy available to depolymerize the coal into smaller molecules. The process is conducted at a pressure from about 500 to 5,000 psig. The process is preferably operated at supercritical conditions at a temperature and pressure within the stated range and usually within 200° C. and preferably within 100° C. of the critical temperature of the mixture, since at higher temperatures an unnecessary pressure and energy penalty is suffered. It is believed that the highest efficiencies are achieved at 300° C. to 400° C. and pressures from 1,000 to 3,000 psig. The process can be operated below the critical temperature of the mixture as long as sufficient volatilization of the higher Tc catalyst solvent into a dense gas phase occurs. Preferably, no more than 10% of the catalyst is present in the reactor as a liquid.

These and many other features and intended advantages of the invention will become apparent as the invention becomes better understood by reference to the following detailed description when considered in conjuncton with the accompanying drawings.

DETAILED DESCRIPTION OF THE INVENTION

Figure 1:
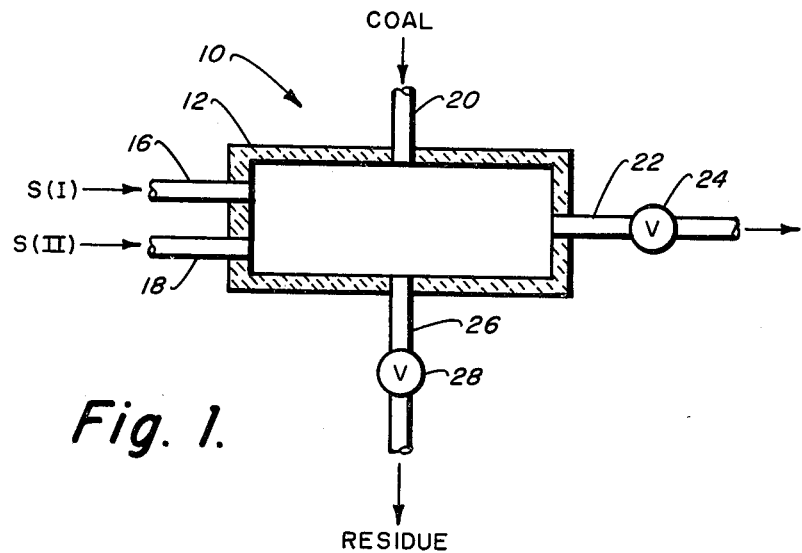
FIG. 1 is a schematic view of the first embodiment of the invention.

Referring now to FIG. 1, the supercritical fluid extraction of coal is practiced in a reactor 10 containing heating means for heating the reactor to extraction temperature such as a heating jacket 12. The solvent extraction of coal is operated by introducing the catalyst solvent S(I) and second solvent S(II) into the reactor through inlets 16 and 18 respectively. Particulate coal is then introduced through inlet 20, and the reactor is pressurized. The reactor is then heated to temperature by means of jacket 12. A pressurized gas phase is recovered through outlet 22 when valve 24 is open and the inorganic containing residue can be recovered through outlet 26 when valve 28 is open.

Figure 2:
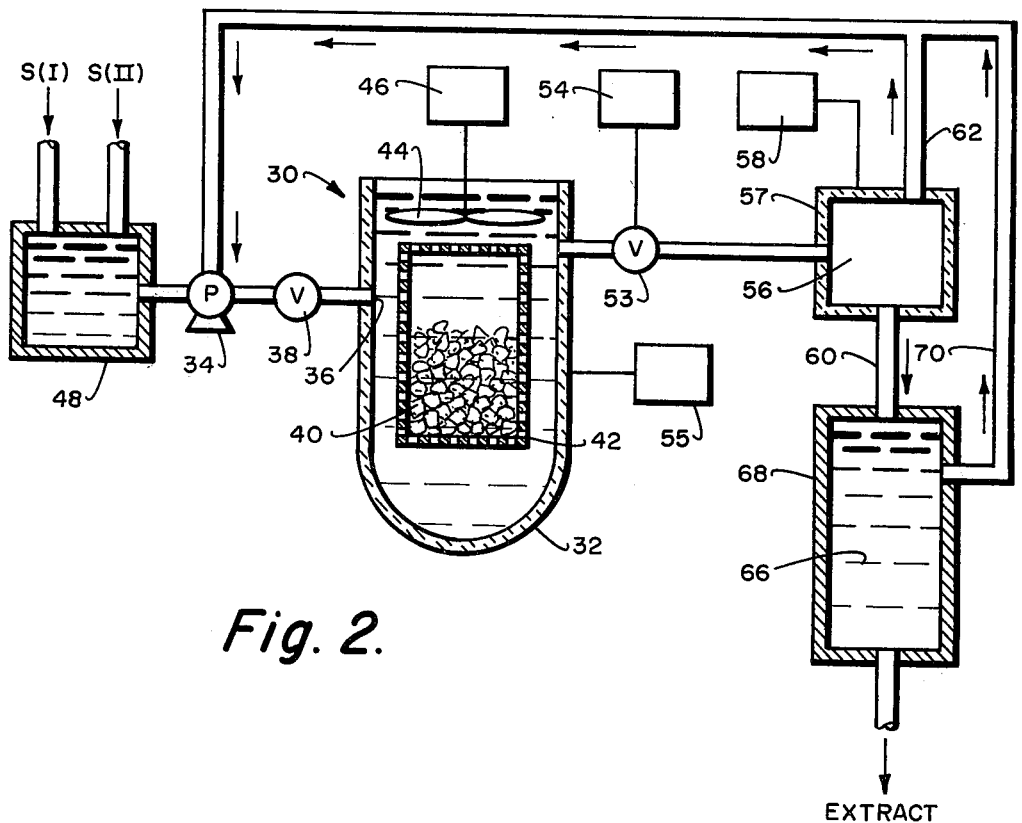
FIG. 2 is a schematic view of an experimental embodiment of the system of the invention.

Referring now to FIG. 2, a solid extraction apparatus comprises a heated autoclave reactor 30 containing a heating jacket 32. The high-pressure, metering pump 34 injects liquid solvent from tank 48 into the reactor 30 through inlet 36 containing valve 38. The particulate coal 40 is placed within a porous container 42. Propellor blades 44 rotated by means of motor 46 stir the gas phase located just above the porous container 42. The jacket controlled by controller 55 gradually heats the autoclave to temperature while the gas is stirred by means of propellor blades 44. The gas phase can be incrementally removed and decompressed by means of a pressure reducing valve 53 actuated by controller 54 and leading to the depressurization vessel 56 which is kept at high temperature by heater 57 controlled by controller 58. A liquid phase is recovered through outlet 60 while the higher volatility, lower Tc solvent can be recovered as a gas through outlet 62 for recycle to the reactor 30 through pump 34. The liquid 66 comprising extract and low volatility solvent is further separated by distillation in a still 68. The low volatility solvent is then recycled to pump 34 through line 70.

The first solvent S(I), the catalyst solvent, is present in an amount of at least 1% by weight of the solvent mixture and usually no more than 70% by weight. It is preferred that the S(I) solvent be present in an amount below 50% by weight so that the dissolution reaction can be conducted at the lowest possible temperature that a substantial amount of the S(I) solvent is in the gas phase. In addition to being able to effect coal dissolution, the S(I) solvent is an excellent solvent for the coal fragments. As previously discussed, the S(I) solvents have low volatility and a critical temperature about 450° C. such that crosslinking and polymerization occur if they were used as a pure supercritical fluid.

The S(I) catalyst-type solvents to be utilized herein can be bent or angular configuration polycyclic compounds containing three or more rings such as phenanthrene, 9-methyl phenanthrene, phenanthridine, carbazole, pyrene, 5,6-benzoquinolidine, 5,6-benzoquinoline. The present invention does not contemplate use of straight chain polynuclear compounds such as anthracenes or fluorene, nor the use of hydrogen donor solvents such as tetralin since these compounds are not believed to have catalytic properties for coal dissolution. Even though anthracene is an isomer of phenanthrene it is not an effective coal dissolution catalyst. However, use of "anthracene oil", a distillation cut from coal liquids containing bent ring polycyclics, is contemplated.

The S(II) solvents have a Tc below about 450° C. There is no actual lower temperature limit. However the S(II) solvents must be capable of forming a coal extracting dense gas mixture with the S(I) solvents. Suitable S(II) solvents can be used singly or as mixtures. They include: monocyclic or hetrocyclic aromatics such as benzene (or akylated ($C_1$ to $C_4$) derivatives thereof such as toluene, or xylene) or pyridine; lower alkanols such as methanol; ketones such as acetone and compounds containing less than 12 carbon atoms such as alkanes or alkenes, suitably ethylene, propylene, butene, methane, ethane, propane, butane, pentane or hexane; ethers and esters; mercaptans (aromatic or saturated compounds are preferred for their lack of reactivity with coal or the coal extract); halogenated organic compounds; water, carbon dioxide, carbon monoxide, ammonia, nitrogen, nitrous oxide, carbonyl sulfide, carbon disulfide and sulfur dioxide.

The ratio of solvent to coal can be varied over broad ranges. The amount of coal can be 1 to 99% by weight of the total mixture of coal and solvent. Use of excess solvent provides increased extraction though it also requires considerable handling and separation effort to recover the extract and the solvent for recycle. Therefore, the amount of coal in the reactor is preferably from 10 to 60% of the total weight of coal plus solvent.

The effectiveness of the extraction depends on the rank of the coal. The extraction process of the invention is very effective with bituminous coal. The extraction enhancement for lignite coals is quite unexpected, since the literature indicates that phenanthrene is not an effective dissolution catalyst for lignite coals.

The process of the invention is capable of dissolving fairly large lumps of coal and it is not believed to be necessary to subdivide and classify the coal below about 5 mesh before processing in accordance with the invention.

Examples of practice follow.

The coal samples utilized in these experiments was secured from the Pennsylvania State University sample bank. Their designations are PSOC 086 and PSOC 174. Coal properties are listed in Table I.

Because of the importance of weight loss data, all experiments were carried out with specially dried coal, stored in a desiccator until used. In addition the coal was first ground under nitrogen to −48 to +200 Tyler mesh, dried under nitrogen vacuum at 230° F. (110° C.) and rapidly transferred to a desiccator.

A quantity of coal, e.g. 5 grams, in a porous container was weighed initially, and again after extraction. A quantity of solvent, e.g. 170 grams, was added to the autoclave, and heated gradually to temperature while stirring the gas with propeller blades located just above the porous container, and within the stirred autoclave. The autoclave was cooled, the basket removed, rinsed with solvent, dried, and again carefully weighed. After partial or total evaporation, the coal extract can be cooled to yield a dark, low-melting point, glassy, solid extract. Generally the coal extract has a very low ash content and a significantly lowered inorganic sulfur content. The results of experiments conducted with toluene alone and with toluene-phenanthrene mixtures are tabulated in Table 2.

TABLE 2

| COAL TYPE* PSOC NO. | ASH Wt. % (DTG) | SOLVENT MAKEUP (Wt./Wt.) | SOLVENT/ COAL RATIO (Wt./Wt.) | TEMP. °F. | TIME Hr. | PRESS. Psig. | GAS DENSITY g/cc | COAL ORGANICS EXTRACTED Wt. % | EXTRACTION ENHANCEMENT % |
|---|---|---|---|---|---|---|---|---|---|
| 174 | | Tol.100 | 34.7 | 725 | 17 | 3200 | 0.73 | 47.1 | |
| 174*** | 5.0 | T/P**62/38 | 29.5 | 715 | 16 | 900 | 0.69 | 54.7 | 13.3 |
| 086 | | Tol.100 | 36.0 | 690 | 15.3 | 3050 | 0.73 | 26.1 | |
| 086 | | T/P**83/17 | 39.8 | 692 | 15.3 | 2000 | 0.73 | 30.8 | 17.8 |

*PSOC #086 Lignite rank, EAP seam, 73.2% DMMF Carbon
PSOC #174 EVA rank, Pittsburgh Seam, 94.1% DMMF Carbon
**T/P = Toluene to Phenanthrene ratio
***This run further showed the following:
ASH CONTENT RATIO: Wt. in Res./Wt. in Coal = 2.0
WEIGHT RATIO: Wt. Raw Coal/Wt. Extraction Res. = 2.0
ASH CONTENT in Residue - 10.0 weight %

The comparison of the experiments run with toluene alone with those run with a mixture of phenanthrene+-toluene show an increased extract yield achieved with conjoint use of these two materials. It also appears that extraction yields with pure toluene are higher than expected. Although the literature suggests that maximum laboratory yields of dry coal extract with toluene alone are about 25 or 30 wt.%, the present method carried out for 15 to 17 hours and with solvent densities above about 0.50 gm/cc, raised the observed yield with certain types of coal to more than 40 wt.%. Other experiments with the mixed solvents of the invention showed yields as high as about 50%. Thus the practice of the present process achieves, without hydrogenation, the desired threshold of about 50 wt.% coal extract yields for the first time; it is believed that significantly shorter processing times are possible.

Observed decreases in weight of coal agree well with increase in ash content of the residue or "char" when

TABLE I

| Sample | Moisture % | Ash % (AD) | Ash % (DRY) | Volatile % (AD) | Volatile % (DRY) | Fixed C % (AD) | Fixed C % (DRY) | Total S % (AD) | Total S % (DRY) | Carbon % (AD) | Carbon % (DRY) | Hydrogen % (AD) | Hydrogen % (DRY) |
|---|---|---|---|---|---|---|---|---|---|---|---|---|---|
| PSOC 086 | 4.65 | 9.37 | 9.83 | 41.5 | 43.5 | 44.5 | 46.7 | 0.84 | 0.88 | 61.3 | 64.3 | 4.67 | 4.35 |
| PSOC 174 | 1.31 | 5.32 | 5.39 | 36.2 | 36.7 | 57.2 | 57.9 | 1.92 | 1.94 | 77.8 | 78.8 | 5.61 | 5.54 |

The experiments were conducted in a conventional solid extraction apparatus including a 300 cc autoclave reactor with controlled heating, a high pressure metering pump for pressurized operation, and attendant control devices. The reactor included a porous container and a blade agitator above the container.

analyzed.

It is believed that phenanthrene and certain other bent ring polycyclic compounds, including methyl phenanthrenes; phenanthridine, carbazole, pyrene, 5,6-benzoquinolidine, and 5,6-benzoquinoline, catalyze the breakdown of the raw coal structure in the solvent phase and additionally volatilize the organic coal fragment molecules into the dense gas employed.

Phenanthrene with a critical temperature of 600° C. (1112° F.) and other bent ring polycyclics are not sufficiently volatile at temperatures below about 450° C. (842° F.) to be employed separately in coal extraction under supercritical conditions. Coal is known to undergo polymerization above about 450° C. By conjoint use of toluene and/or other solvents with low critical temperature and a phenanthrene-like material, coal is volatilized at acceptably low temperatures where no significant degree of coal polymerization occurs. Similar improvements in yield are expected with conjoint use of other S(I) and S(II) solvents as previously described.

It is to be realized that only preferred embodiments of the invention have been described and that numerous substitutions, modifications and alterations are permissible without departing from the spirit and scope of the invention as defined in the following claims.

We claim:

1. A method of separating an organic extract from an inorganics-containing coal comprising the steps of:
    adding to a closed reactor particulate coal and a mixture of solvents consisting of a first and second solvent absent straight chain polynuclear compounds and hydrogen donor solvents; said first solvent being present in the mixture in an amount above 1% and below 50% by weight and consisting of at least one low volatility, bent ring, polycyclic, aromatic organic compound containing at least three rings, having a high critical temperature above 450° C. and being capable of at least 20% by weight catalytic dissolution of the coal into the soluble extract fragments and the second solvent consisting of a higher volatility organic or inorganic compound which is stable at the operating temperature and having a critical temperature below 300° C.;
    heating the reactor to a temperature above 250° C. and below 450° C. and within 200° C. above or below the critical temperature of the solvent mixture at a pressure from 500 to 5,000 psig to form a dense gas phase;
    extracting organic coal components into the dense gas phase; and
    removing said phase from the reactor.

2. A method according to claim 1 in which the first solvent is anthracene oil.

3. A method according to claim 1 in which the first solvent is one or more solvents selected from the group consisting of phenanthrene, methyl phenanthrenes, phenanthridine, carbazole, pyrene, 5,6-benzoquinolidine and 5,6-benzoquinoline.

4. A method according to claim 1 in which the second solvent comprises sulfur dioxide.

5. A method according to claim 1 in which the second solvent is one or more solvents selected from heterocyclic and/or monocylic aromatic compounds, alkanols, ketones, ethers, esters, mercaptans, alkanes, alkenes, halogenated organics, water, carbon dioxide, carbon monoxide, ammonia, nitrous oxide, carbonyl sulfide and carbon disulfide.

6. A method according to claim 5 in which the second solvent is toluene and the first solvent is phenanthrene.

7. A method according to claim 6 in which the coal is present in the reactor in an amount of from 1 to 99% by weight of the total weight of coal and solvent.

8. A method according to claim 1 in which the reactor is heated to a temperature from 300° C. to 400° C. and a pressure from about 1,000 to 2,500 psig.

9. A method according to claim 1 further including the step of separating said extract from said removed phase.

10. A method according to claim 1 in which the density of the gas in the gas phase is above 0.5 g/cc.

11. A method according to claim 1 in which the second solvent is selected from monocyclic compounds, heterocyclic aromatic compounds or alkylated $C_1$ to $C_4$ derivatives of said compounds.

12. A method according to claim 11 in which the second solvent is selected from benzene, toluene, xylene or pyridine.

13. A method according to claim 12 in which the second solvent is toluene.

* * * * *